(No Model.)
J. A. SHULL.
SAW TOOTH SWAGING DEVICE.
No. 357,866. Patented Feb. 15, 1887.
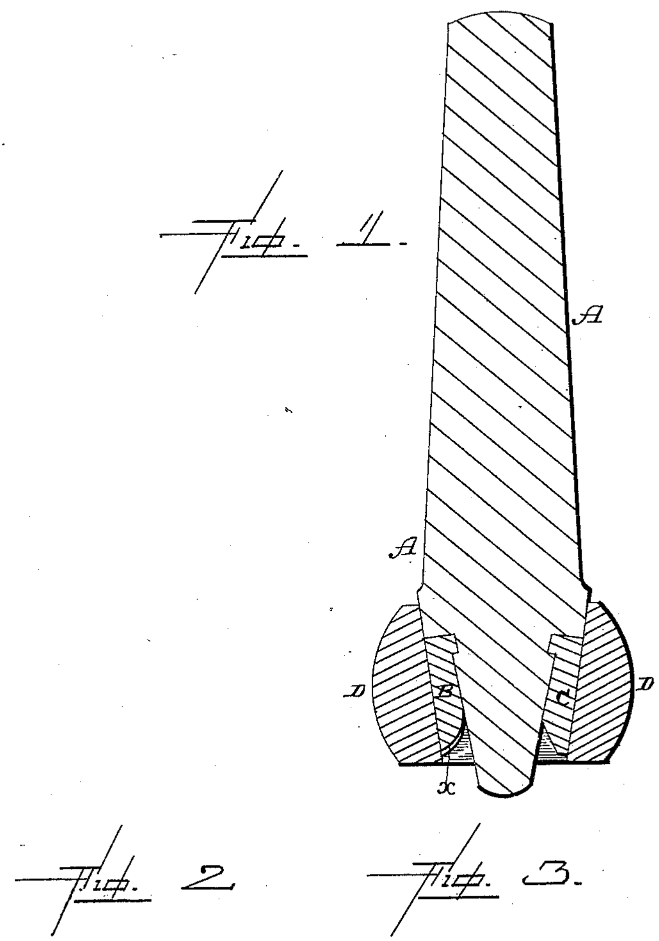
Witnesses.
L. F. Gardner
A. W. Brecht
Inventor.
J. A. Shull,
per J. A. Lehmann, atty.
N. PETERS, Photo-Lithographer, Washington, D. C.

UNITED STATES PATENT OFFICE.

JOHN A. SHULL, OF POPLAR BLUFF, MISSOURI.

SAW-TOOTH-SWAGING DEVICE.

SPECIFICATION forming part of Letters Patent No. 357,866, dated February 15, 1887.

Application filed July 13, 1886. Serial No. 207,888. (No model.)

*To all whom it may concern:*

Be it known that I, JOHN A. SHULL, of Poplar Bluff, in the county of Butler and State of Missouri, have invented certain new and useful Improvements in Saw-Swages; and I do hereby declare the following to be a full, clear, and exact description of the invention, such as will enable others skilled in the art to which it pertains to make and use it, reference being had to the accompanying drawings, which form part of this specification.

My invention relates to an improvement in saw-swages; and it consists in the combination of the handle, which is shaped at one end so as to receive the dies, the dies, which are applied to the opposite side of the handle, and the collar, by which the dies are held in position, one of the dies being made rounded on its end and concave upon its inner side and the other convex on its inner edge, as will be more fully described hereinafter.

The object of my invention is to produce a saw-swage which will flatten the point of the tooth and produce shoulders thereon, which will cut hard, tough, and knotty timber without crumbling or breaking.

Figure 1 represents a vertical section of a swage embodying my invention. Figs. 2 and 3 are perspectives of the dies, taken from their inner sides.

A represents the handle, which is shaped, as shown, at its outer edge so as to receive the two dies B and C, which are applied to opposite edges and held in position by means of the collar D, in the usual manner. The die B has its outer end rounded away, and in the center of this rounded portion is a concavity, $x$, and the bottom of this concavity terminates at the inclined side of the handle, as shown. The die C has its outer end made convex, as shown, from one side to the other.

In using the swage the tooth of the saw should be first placed in the recess of die B and one blow struck on the end of the handle; then shift the swage to each outer edge of the tooth, striking one blow at each edge, or more if the hardness of the metal of the tooth requires it; then introduce the point of the tooth into the recess of die C and strike one blow, when the tooth will be ready for the file. By placing the tooth in the recess of the rounded and concave-ended die B, striking one blow on the center, shifting the swage to each outer edge of the tooth and striking, and then placing the tooth in the recess of the convex die C and striking, the point of the tooth is widened to any desired degree, and the shoulders or points of the tooth are made sufficiently strong and substantial to stand wear and tear in any kind of timber. By means of the rounded and concave die the tooth is gripped in such a manner as to spread it and at the same time prevent its splitting and crumbling, as is frequently the case when struck on the convex die alone. A solid shoulder being formed upon each point of the tooth, there is a saving effected in files, saws, and labor.

Having thus described my invention, I claim—

The combination of the handle having its end so shaped as to receive the dies, the two dies, which are applied to opposite edges of the handle, and the collar, which holds the dies in position, one of the dies being made convex at its outer end and the other having its end rounded away and concaved, substantially as shown and described.

In testimony whereof I affix my signature in presence of two witnesses.

JOHN A. SHULL.

Witnesses:
GEORGE M. WILSON,
HAMELTON GRIDES.